United States Patent
Parker et al.

(10) Patent No.: US 11,210,027 B2
(45) Date of Patent: Dec. 28, 2021

(54) WEIGHTING OF READ COMMANDS TO ZONES IN STORAGE DEVICES

(71) Applicant: Western Digital Technologies, Inc., San Jose, CA (US)

(72) Inventors: Liam Parker, Edinburgh (GB); Daniel L. Helmick, Broomfield, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 37 days.

(21) Appl. No.: 16/847,352

(22) Filed: Apr. 13, 2020

(65) Prior Publication Data

US 2021/0318833 A1 Oct. 14, 2021

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0652* (2013.01); *G06F 3/0679* (2013.01)

(58) Field of Classification Search
CPC ...... G06F 3/0659; G06F 3/0679; G06F 3/064; G06F 3/0604; G06F 3/0652
See application file for complete search history.

(56) References Cited

U.S. PATENT DOCUMENTS

| 9,552,171 | B2 * | 1/2017 | Huang | G06F 3/0679 |
| 9,711,234 | B1 | 7/2017 | Van Gaasbeck | |
| 10,089,170 | B1 * | 10/2018 | Goss | G06F 11/0793 |
| 2015/0370701 | A1 | 12/2015 | Higgins et al. | |
| 2016/0124679 | A1 * | 5/2016 | Huang | G11C 16/349 711/103 |
| 2016/0306591 | A1 | 10/2016 | Ellis et al. | |
| 2017/0075593 | A1 * | 3/2017 | Kim | G06F 3/0616 |
| 2018/0004415 | A1 * | 1/2018 | Lee | G11C 16/3495 |

FOREIGN PATENT DOCUMENTS

WO 2016069126 A1 5/2016

OTHER PUBLICATIONS

International Search Report and the Written Opinion for International Application No. PCT/US2020/064609 dated Apr. 4, 2021, 11 pages.

* cited by examiner

*Primary Examiner* — Francisco A Grullon
(74) *Attorney, Agent, or Firm* — Patterson & Sheridan, LLP; Steven H. Versteeg (57) ABSTRACT

The present disclosure generally relates to methods of operating storage devices. The storage device comprises a controller and a storage unit divided into a plurality of zones, each zone comprises a plurality of erase blocks. Data is written to an erase block of a zone to a program point that is less than the writeable capacity of the erase block. The data in the erase block is associated with various read weights dependent on the location of the data relative to the program point. Data stored closer to the program point has a higher read weight than data stored closer to the beginning of the erase block. The read weights indicate an error susceptibility of the data. When one or more read commands are received, the read weights of the data being read are accumulated to estimate the bit error accumulation until a predetermined value is reached.

20 Claims, 7 Drawing Sheets

WEIGHTING OF READ COMMANDS TO ZONES IN STORAGE DEVICES

BACKGROUND OF THE DISCLOSURE

Field of the Disclosure

Embodiments of the present disclosure generally relate to storage devices, such as sold state drives (SSDs).

Description of the Related Art

Storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The data is read and written to one or more erase blocks in the memory device. Each of the logical block addresses is associated with a physical media location so that the SSD and/or the host device know the location of where the data is stored. One or more erase blocks of the physical media may be grouped together by their respective logical block addresses to form a plurality of zones.

Erase blocks storing data may accumulate bit errors or read disturb errors after the data has been read from the erase block several times, which may lead to the data becoming lost or unreadable. When the total number of reads of data within an erase block exceeds a predetermined value such as 1000 reads, the erase block is closed to prevent data loss due to the accumulation of excessive bit errors or read disturb errors. A predetermined value such as the 1000 reads may signal the controller to either close an erase block prematurely or too late, allowing the erase block to accumulate an undesirable quantity of bit errors.

Therefore, what is needed is a new method of accurately determining the accumulation of bit errors in opened erase blocks in a storage device.

SUMMARY OF THE DISCLOSURE

The present disclosure generally relates to methods of operating storage devices. The storage device comprises a controller and a storage unit divided into a plurality of zones, each zone comprises a plurality of erase blocks. Data is written to an erase block of a zone to a program point that is less than the writeable capacity of the erase block. The data in the erase block is associated with various read weights dependent on the location of the data relative to the program point. Data stored closer to the program point has a higher read weight than data stored closer to the beginning of the erase block. The read weights indicate an error susceptibility of the data. When one or more read commands are received, the read weights of the data being read are accumulated to estimate the bit error accumulation until a predetermined value is reached.

In one embodiment, a storage device comprises a non-volatile storage unit. The capacity of the non-volatile storage unit is divided into a plurality of zones. The non-volatile storage unit further comprises a plurality of dies and each of the plurality of dies comprises a plurality of erase blocks. The storage device further comprises a controller coupled to the non-volatile storage unit. The controller is configured to write data associated with one or more first commands to a first zone of the plurality of zones sequentially. The first zone has a writeable capacity and the data associated with the one or more first commands partially fills the first zone to a first program point less than the writeable capacity. The controller is further configured to receive one or more read commands to read the data from the first zone non-sequentially, wherein each of the one or more read commands is associated with a weight based on a closeness of the data being read to the first program point, and wherein at least two weights of the one or more read commands are different.

In another embodiment, a storage device comprises a non-volatile storage unit. The capacity of the non-volatile storage unit is divided into a plurality of zones. The non-volatile storage unit further comprises a plurality of dies and each of the plurality of dies comprises a plurality of erase blocks. The storage device further comprises a controller coupled to the non-volatile storage unit. The controller is configured to receive a plurality of read commands to read data from a partially full first erase block of a first zone of the plurality of zones non-sequentially, wherein each of the read commands is associated with a weight based on a location of the data being read within the first erase block, and wherein at least two weights of the read commands are different. The controller is further configured to close the first erase block when a sum of the weights associated with the read commands accumulates to a predetermined value.

In another embodiment, a storage device comprises a non-volatile storage unit. The capacity of the non-volatile storage unit is divided into a plurality of zones. The non-volatile storage unit further comprises a plurality of dies and each of the plurality of dies comprises a plurality of erase blocks. The storage device further comprises a controller coupled to the non-volatile storage unit. The controller is configured to receive one or more first read commands to read first data from a partially full first erase block of a first zone, where the one or more first read commands each being associated with a first weight. The controller is further configured to receive one or more second read commands to read second data from the partially full first erase block, where the one or more second read commands each being associated with a second weight greater than the first weight. The controller is also configured to receive one or more third read commands to read third data from the partially full first erase block, where the one or more third read commands each being associated with a third weight greater than the first weight and the second weight, and wherein the third weight indicates a higher error susceptibility than the first and second weights. The controller is configured to close the first erase block when a sum of the first, second, and third weights accumulates to a predetermined value.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to methods of operating storage devices. The storage device comprises a controller and a storage unit divided into a plurality of zones, each zone comprises a plurality of erase blocks. Data is written to an erase block of a zone to a program point that is less than the writeable capacity of the erase block. The data in the erase block is associated with various read weights dependent on the location of the data relative to the program point. Data stored closer to the program point has a higher read weight than data stored closer to the beginning of the erase block. The read weights indicate an error susceptibility of the data. When one or more read commands are received, the read weights of the data being read are accumulated to estimate the bit error accumulation until a predetermined value is reached.

Figure 1:
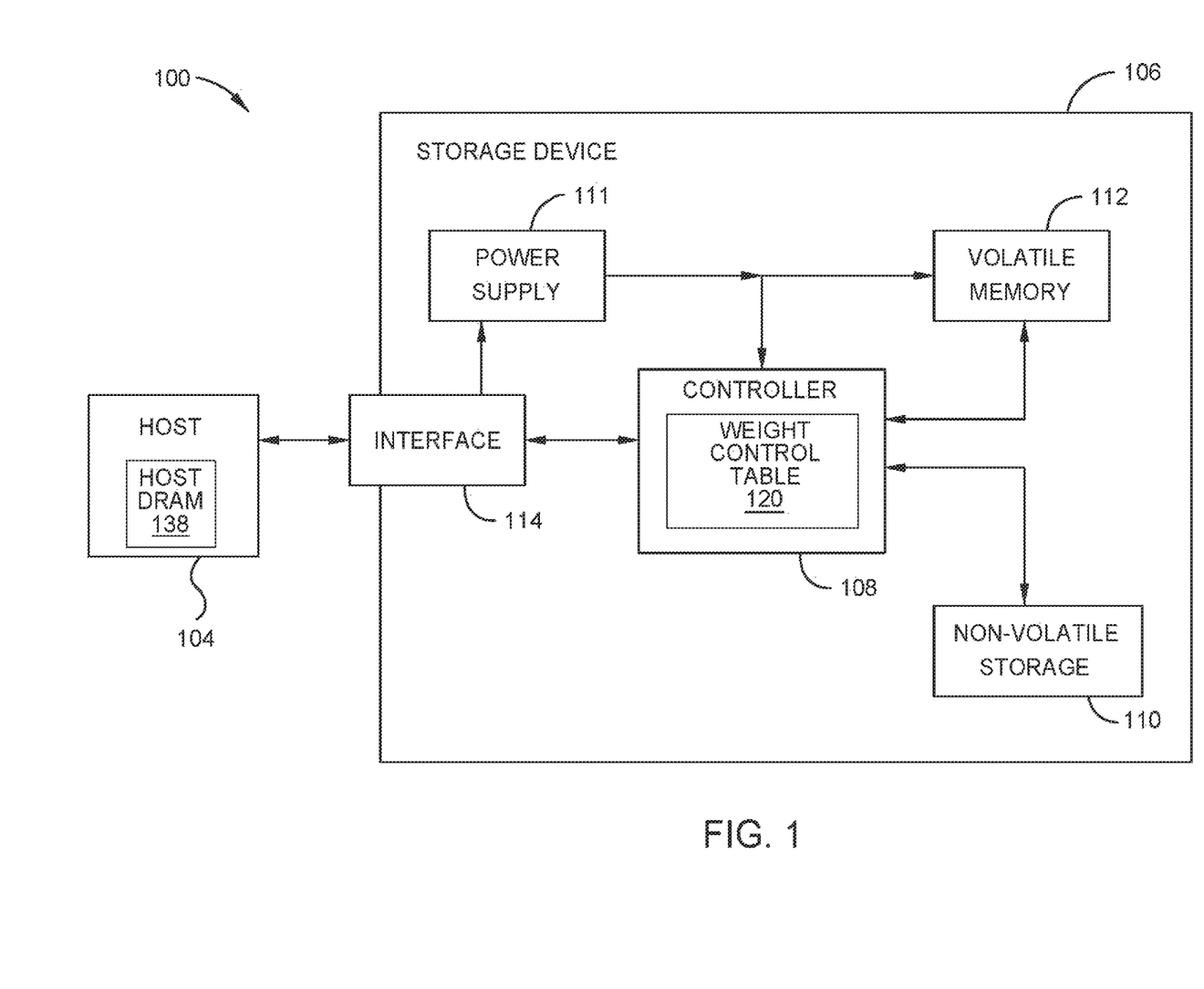
FIG. 1 is a schematic block diagram illustrating a storage system, according to one embodiment.

FIG. 1 is a schematic block diagram illustrating a storage system 100 in which storage device 106 may function as a storage device for a host device 104, in accordance with one or more techniques of this disclosure. For instance, the host device 104 may utilize a storage unit 110, such as non-volatile memory, included in storage device 106 to store and retrieve data. The storage unit 110 may be any type of non-volatile memory, such as MRAM, NAND, NOR, or HDD, for example. In the following descriptions, the storage unit 110 is referenced as a non-volatile memory (NVM) 110 for simplification and exemplary purposes. The host device 104 comprises a host DRAM 138. In some examples, the storage system 100 may include a plurality of storage devices, such as the storage device 106, which may operate as a storage array. For instance, the storage system 100 may include a plurality of storage devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The storage device 106 includes a controller 108, NVM 110, a power supply 111, volatile memory 112, and an interface 114. The controller 108 comprises an internal memory or buffer (not shown). In some examples, the storage device 106 may include additional components not shown in FIG. 1 for sake of clarity. For example, the storage device 106 may include a printed circuit board (PCB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, PCIe, non-volatile memory express (NVMe), OpenCAPI, GenZ, Cache Coherent Interface Accelerator (CCIX), Compute Express Link (CXL), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 may receive power from the host device 104 via the interface 114.

The storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a wordline to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, DDR5, LPDDR5, and the like)).

The various types of volatile memories may be used with different access properties. For example, DRAM may be arranged for longer burst accesses to allow for improved bandwidth (BW) of the same access bus. Alternatively, DRAM may be used with smaller accesses such that random small accesses may have better latency. The controller 108 comprises additional optional SRAM and/or embedded MRAM (not shown). Embedded MRAM is another alternative memory that may be used in another embodiment. Similarly, the access to the MRAM can be optimized for different design purposes, but the quantity of embedded MRAM in the SSD controller 108 may be cost sensitive. Therefore, the choice of how much data and which data goes into the premium non-volatile memory and premium volatile memory will subject to system tradeoffs.

The storage device 106 includes a controller 108, which may manage one or more operations of the storage device 106. For instance, the controller 108 may manage the reading of data from and/or the writing of data to the NVM 110 via a toggle mode (TM) bus (not shown). In some embodiments, when the storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the storage device 106 receives a write command from the host device 104, the controller 108 temporarily stores the data associated with the write command in the internal memory before sending the data to the NVM 110.

Figure 2:
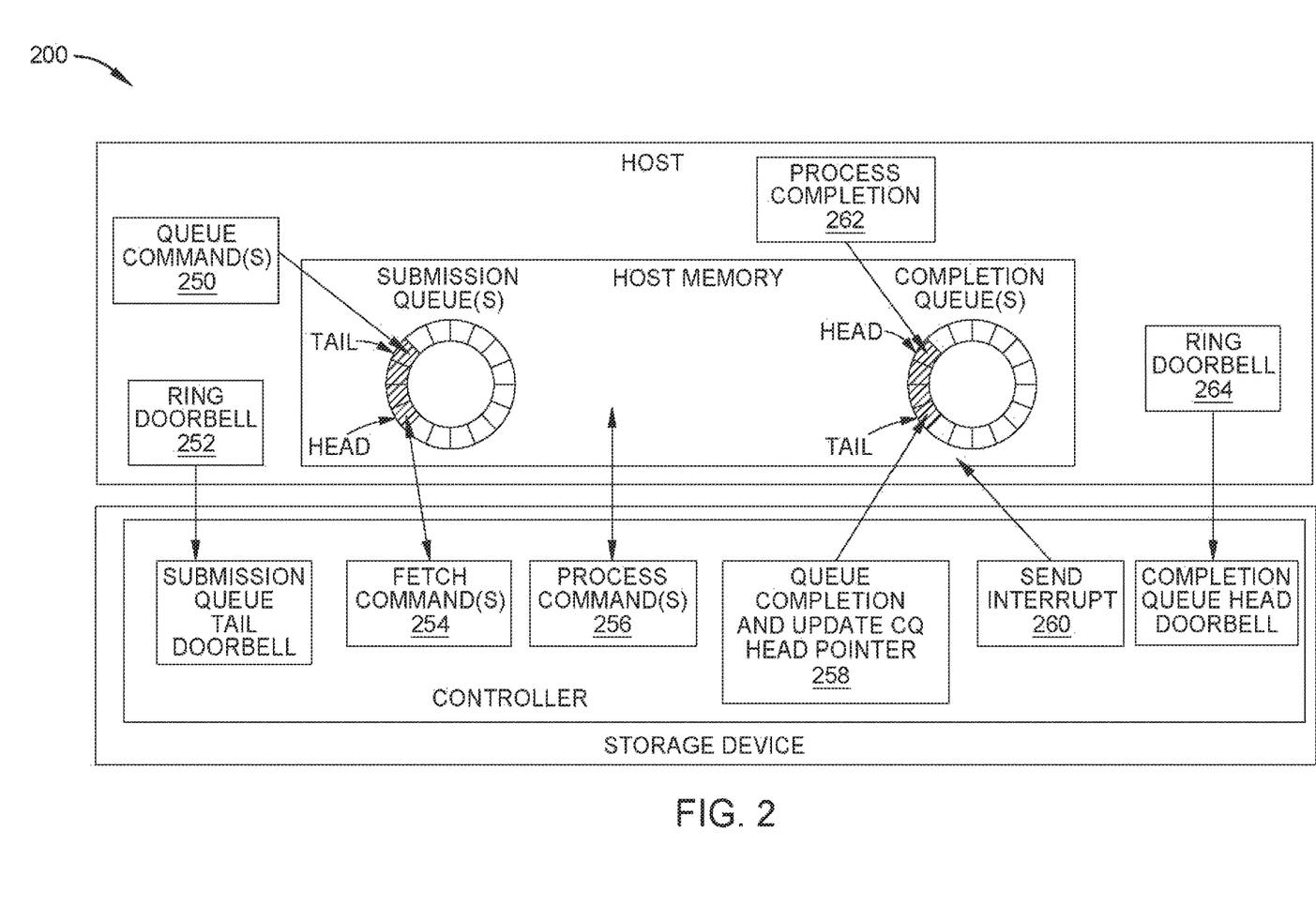
FIG. 2 is a block diagram illustrating a method of operating a storage device to execute a read or write command, according to one embodiment.

FIG. 2 is a block diagram illustrating a method 200 of operating a storage device to execute a read or write command, according to one embodiment. Method 200 may be used with the storage system 100 having a host device 104 and a storage device 106 comprising a controller 108. Method 200 may be used with the device a host device and a storage device comprising a command processor.

Method 200 begins at operation 250, where the host device writes a command into a submission queue as an entry. The host device may write one or more commands into the submission queue at operation 250. The commands may be read commands or write commands. The host device may comprise one or more submission queues. The host device may write one or more commands to the submission queue in any order (i.e., a submission order), regardless of the sequential write order of the one or more commands (i.e., a sequential processing order).

In operation 252, the host device writes one or more updated submission queue tail pointers and rings a doorbell or sends an interrupt signal to notify or signal the storage device of the new command that is ready to be executed. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queue, and the controller receives or DMA reads the command.

In operation 256, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more logical block addresses (LBA) of the zone, and advancing a write pointer of the zone to identify the next available LBA within the zone.

In operation 258, once the command has been fully processed, the controller writes a completion entry corresponding to the executed command to a completion queue of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3A:
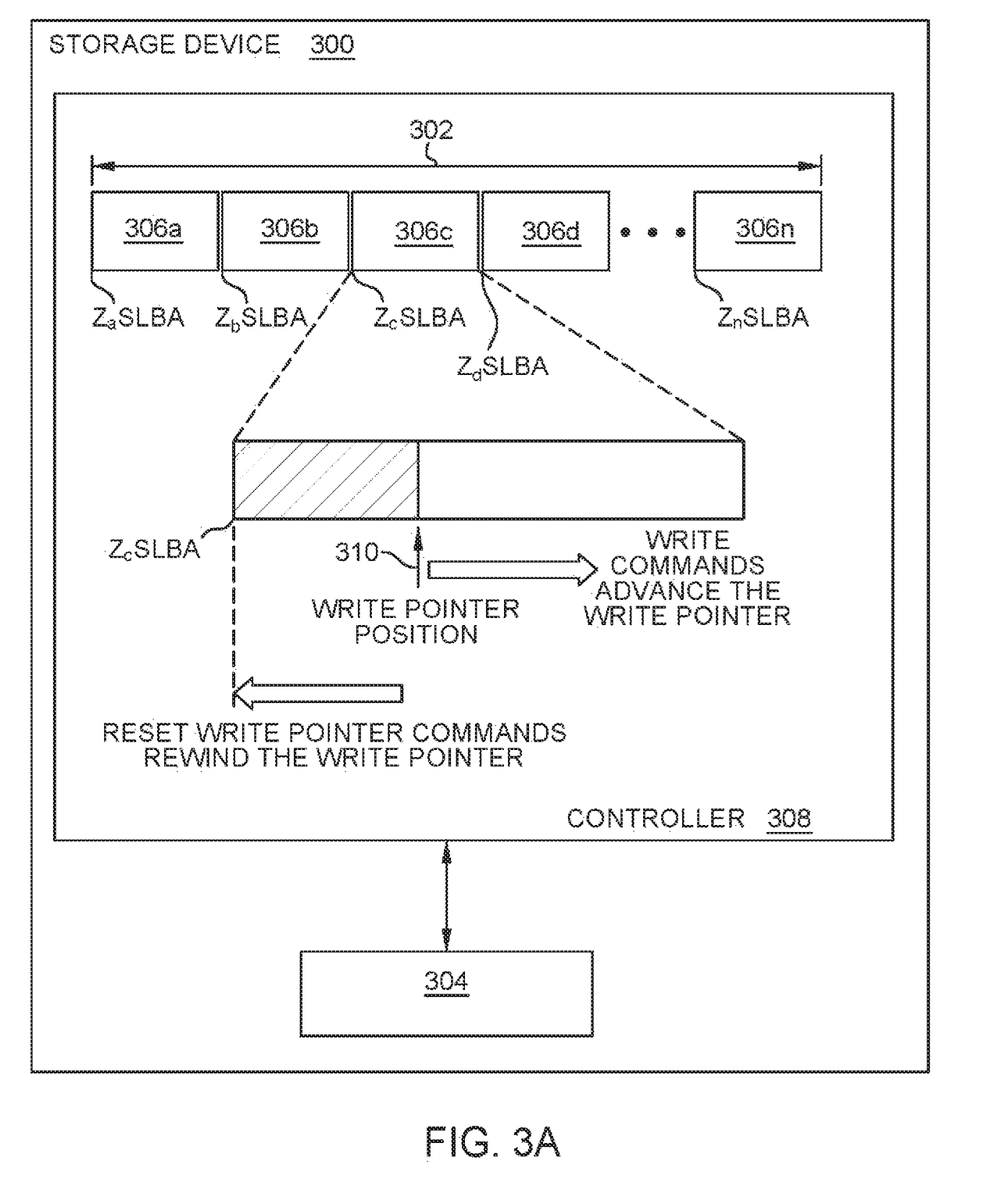
FIG. 3A illustrates a zoned namespaces utilized in a storage device, according to one embodiment.
Figure 3B:
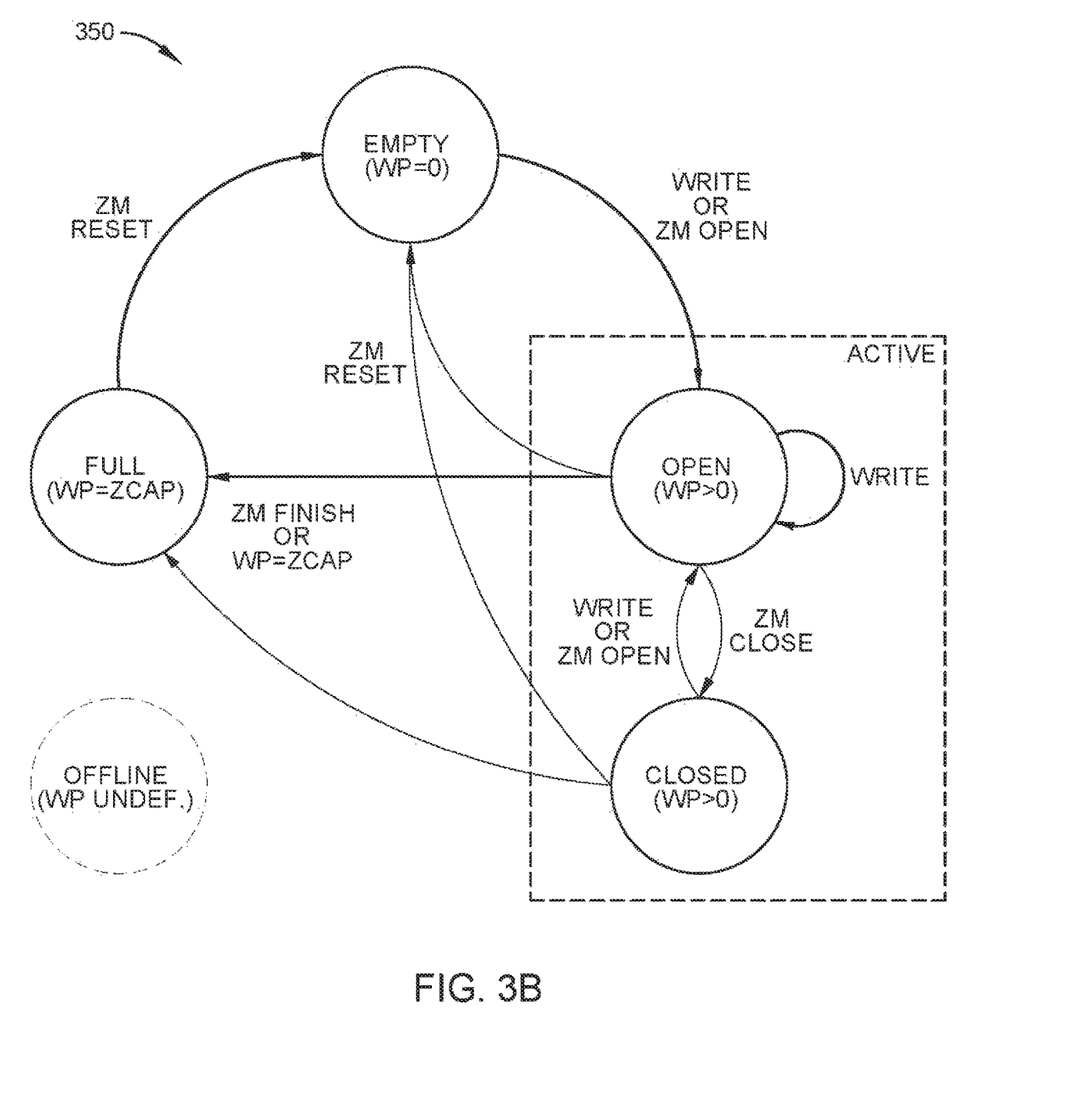
FIG. 3B illustrates a state diagram for the zoned namespaces of the storage device of FIG. 3A, according to one embodiment.

FIG. 3A illustrates a Zoned Namespaces (ZNS) 302 view utilized in a storage device 300, according to one embodiment. The storage device 300 may present the ZNS 302 view to a host device. FIG. 3B illustrates a state diagram 350 for the ZNS 302 of the storage device 300, according to one embodiment. The storage device 300 may be the storage device 106 of the storage system 100 of FIG. 1. The storage device 300 may have one or more ZNS 302, and each ZNS 302 may be different sizes. The storage device 300 may further comprise one or more conventional namespaces in addition to the one or more Zoned Namespaces 302. Moreover, the ZNS 302 may be a zoned block command (ZBC) for SAS and/or a zoned-device ATA command set (ZAC) for SATA. Host side zone activity may be more directly related to media activity in zoned drives due to the relationship of logical to physical activity possible.

In the storage device 300, the ZNS 302 is the quantity of NVM that can be formatted into logical blocks such that the capacity is divided into a plurality of zones 306a-306n (collectively referred to as zones 306). The NVM may be the storage unit or NVM 110 of FIG. 1. Each of the zones 306 comprise a plurality of physical or erase blocks (not shown) of a memory unit or NVM 304, and each of the erase blocks are associated a plurality of logical blocks (not shown). Each of the zones 306 may have a size aligned to the capacity of one or more erase blocks of a NVM or NAND device. When the controller 308 receives a command, such as from a host device (not shown) or the submission queue of a host device, the controller 308 can read data from and write data to the plurality of logical blocks associated with the plurality of erase blocks (EBs) of the ZNS 302. Each of the logical blocks is associated with a unique LBA or sector.

In one embodiment, the NVM 304 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 KiB per page). Furthermore, each page can be accessed at a granularity equal to or smaller than the full page. A controller can frequently access NAND in user data granularity LBA sizes of 512 bytes. Thus, as referred to in the below description, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as an example.

When data is written to an erase block, one or more logical blocks are correspondingly updated within a zone 306 to track where the data is located within the NVM 304. Data may be written to one zone 306 at a time until a zone 306 is full, or to multiple zones 306 such that multiple zones 306 may be partially full. Similarly, when writing data to a particular zone 306, data may be written to the plurality of erase blocks one block at a time, in sequential order of wordline-by-wordline, until moving to an adjacent block (i.e., write to a first erase block until the first erase block is full before moving to the second erase block), or to multiple blocks at once, in sequential order of wordline-by-wordline, to partially fill each block in a parallel fashion (i.e., writing the first wordline of each erase block before writing to the second wordline of each erase block). This sequential programming of every NAND location is a typical non-limiting requirement of many NAND EBs.

When a controller 308 selects the erase blocks that will store the data for each zone, the controller 308 will be able to choose the erase blocks either at the zone open time or it may choose the erase blocks as it reaches a need to fill the first wordline of that particular erase block. This may be more differentiating when the above described method of filling one erase block completely prior to starting the next erase block is utilized. The controller 308 may use the time difference to select a more optimal erase block in a just-in-time basis. The decision of which erase block is allocated and assigned for each zone and its contiguous LBAs can be occurring for zero or more concurrent zones at all times within the controller 308.

Each of the zones 306 is associated with a zone starting logical block address (ZSLBA) or zone starting sector. The ZSLBA is the first available LBA in the zone 306. For example, the first zone 306a is associated with $Z_a$SLBA, the second zone 306b is associated with $Z_b$SLBA, the third zone 306c is associated with $Z_c$SLBA, the fourth zone 306d is associated with $Z_d$SLBA, and the $n^{th}$ zone 306n (i.e., the last zone) is associated with $Z_n$SLBA. Each zone 306 is identified by its ZSLBA, and is configured to receive sequential writes (i.e., writing data to the NVM 110 in the order the write commands are received).

As data is written to a zone 306, a write pointer 310 is advanced or updated to point to or to indicate the next available block in the zone 306 to write data to in order to track the next write starting point (i.e., the completion point of the prior write equals the starting point of a subsequent write). Thus, the write pointer 310 indicates where the subsequent write to the zone 306 will begin. Subsequent write commands are 'zone append' commands, where the data associated with the subsequent write command appends to the zone 306 at the location the write pointer 310 is indicating as the next starting point. An ordered list of LBAs within the zone 306 may be stored for write ordering. Each zone 306 may have its own write pointer 310. Thus, when a write command is received, a zone is identified by its ZSLBA, and the write pointer 310 determines where the write of the data begins within the identified zone.

FIG. 3B illustrates a state diagram 350 for the ZNS 302 of FIG. 3A. In the state diagram 350, each zone may be in a different state, such as empty, active, full, or offline. When a zone is empty, the zone is free of data (i.e., none of the erase blocks in the zone are currently storing data) and the write pointer is at the ZSLBA (i.e., WP=0). An empty zone switches to an open and active zone once a write is scheduled to the zone or if the zone open command is issued by the host. Zone management (ZM) commands can be used to move a zone between zone open and zone closed states, which are both active states. If a zone is active, the zone comprises open blocks that may be written to, and the host may be provided a description of recommended time in the active state. The controller 308 comprises the ZM. Zone metadata may be stored in the ZM and/or the controller 308.

The term "written to" includes programming user data on 0 or more NAND locations in an erase block and/or partially filled NAND locations in an erase block when user data has not filled all of the available NAND locations. The term "written to" may further include moving a zone to full due to internal drive handling needs (open block data retention concerns because the bits in error accumulate more quickly on open erase blocks), the storage device 300 closing or filling a zone due to resource constraints, like too many open zones to track or discovered defect state, among others, or a host device closing the zone for concerns such as there being no more data to send the drive, computer shutdown, error handling on the host, limited host resources for tracking, among others.

The active zones may be either open or closed. An open zone is an empty or partially full zone that is ready to be written to and has resources currently allocated. The data received from the host device with a write command or zone append command may be programmed to an open erase block that is not currently filled with prior data. A closed zone is an empty or partially full zone that is not currently receiving writes from the host in an ongoing basis. The movement of a zone from an open state to a closed state allows the controller 308 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available sectors or LBAs to write data to (i.e., WP=zone capacity (ZCAP)). In a full zone, the write pointer points to the end of the writeable capacity of the zone. Read commands of data stored in full zones may still be executed.

The zones may have any total capacity, such as 256 MiB or 512 MiB. However, a small portion of each zone may be inaccessible to write data to, but may still be read, such as a portion of each zone storing the parity data and one or more excluded erase blocks. For example, if the total capacity of a zone 306 is 512 MiB, the ZCAP may be 470 MiB, which is the capacity available to write data to, while 42 MiB are unavailable to write data. The writeable capacity (ZCAP) of a zone is equal to or less than the total zone storage capacity. The storage device 300 may determine the ZCAP of each zone upon zone reset. For example, the controller 308 or the ZM may determine the ZCAP of each zone. The storage device 300 may determine the ZCAP of a zone when the zone is reset.

The ZM may reset a full zone, scheduling an erasure of the data stored in the zone such that the zone switches back to an empty zone. When a full zone is reset, the zone may not be immediately cleared of data, though the zone may be marked as an empty zone ready to be written to. However, the reset zone must be erased prior to switching to an open and active zone. A zone may be erased any time between a ZM reset and a ZM open. Upon resetting a zone, the storage device 300 may determine a new ZCAP of the reset zone and update the Writeable ZCAP attribute in the zone metadata. An offline zone is a zone that is unavailable to write data to. An offline zone may be in the full state, the empty state, or in a partially full state without being active.

Since resetting a zone clears or schedules an erasure of all data stored in the zone, the need for garbage collection of individual erase blocks is eliminated, improving the overall garbage collection process of the storage device 300. The storage device 300 may mark one or more erase blocks for erasure. When a new zone is going to be formed and the storage device 300 anticipates a ZM open, the one or more erase blocks marked for erasure may then be erased. The storage device 300 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer 310 for the zone 306 may be selected, enabling the zone 306 to be tolerant to receive commands out of sequential order. The write pointer 310 may optionally be turned off such that a command may be written to whatever starting LBA is indicated for the command.

Referring back to FIG. 3A, when the host sends a write command to write data to a zone 306, the controller 308 pulls-in the write command and identifies the write command as a write to a newly opened zone 306. The controller 308 selects a set of EBs to store the data associated with the write commands of the newly opened zone 306 to, and the newly opened zone 306 switches to an active zone 306. The write command may be a command to write new data, or a command to move valid data to another zone for garbage collection purposes. The controller 308 is configured to DMA read new commands from a submission queue populated by a host device.

In an empty zone 306 just switched to an active zone 306, the data is assigned to the zone 306 and the associated set of sequential LBAs of the zone 306 starting at the ZSLBA, as the write pointer 310 is indicating the logical block associated with the ZSLBA as the first available logical block. The data may be written to one or more erase blocks or NAND locations that have been allocated for the physical location of the zone 306. After the data associated with the write command has been written to the zone 306, a write pointer 310 is updated to point to the next LBA available for a host write (i.e., the completion point of the first write). The write data from this host write command is programmed sequentially into the next available NAND location in the erase block selected for physical backing of the zone.

For example, the controller 308 may receive a first write command to a third zone 306c, or a first zone append command. The host identifies sequentially which logical block of the zone 306 to write the data associated with the first command to. The data associated with the first command is then written to the first or next available LBA(s) in the third zone 306c as indicated by the write pointer 310, and the write pointer 310 is advanced or updated to point to the next available LBA available for a host write (i.e., WP>0). If the controller 308 receives a second write command to the third zone 306c, or a second zone append command, the data associated with the second write command is written to the next available LBA(s) in the third zone 306c identified by the write pointer 310. Once the data associated with the second command is written to the third zone 306c, the write pointer 310 once again advances or updates to point to the next available LBA available for a host write. Resetting the third zone 306c moves the write pointer 310 back to the ZGSLBA (i.e., WP=0), and the third zone 306c switches to an empty zone.

Figure 4A:
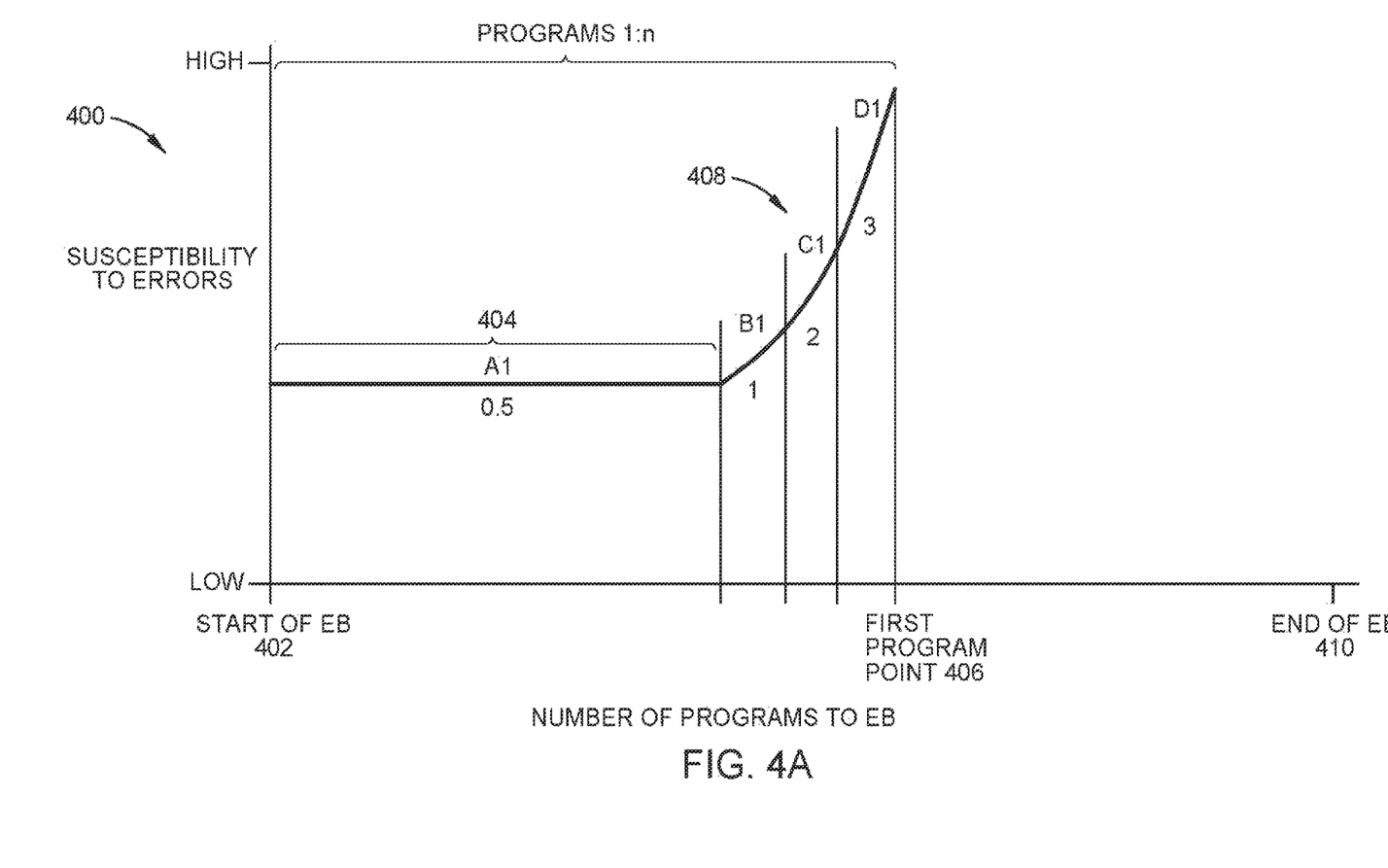
FIGS. 4A-4C are graphs illustrating the number of programs of an erase block to the read error susceptibility of the erase block, according to various embodiments.
Figure 4B:
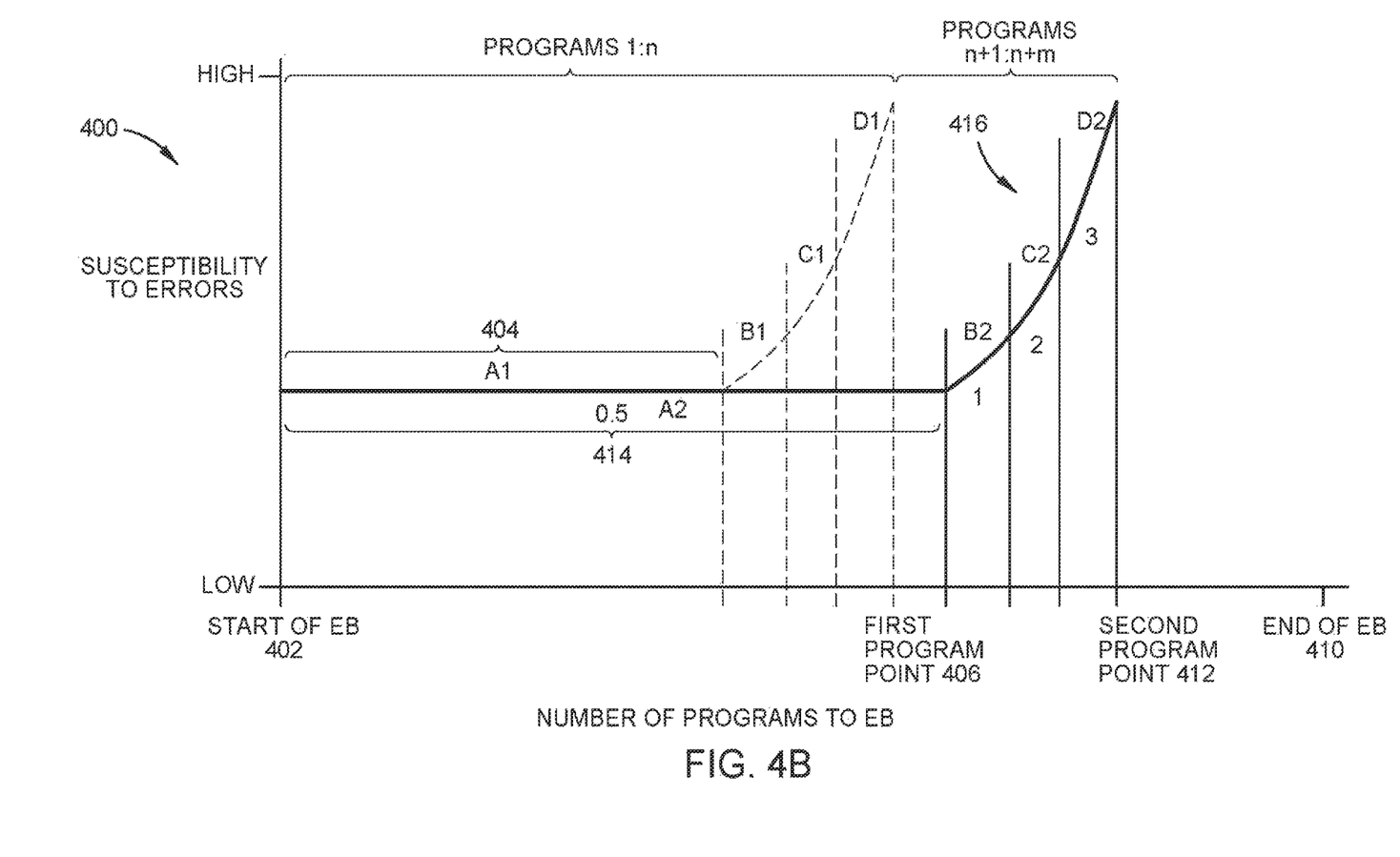
Figure 4C:
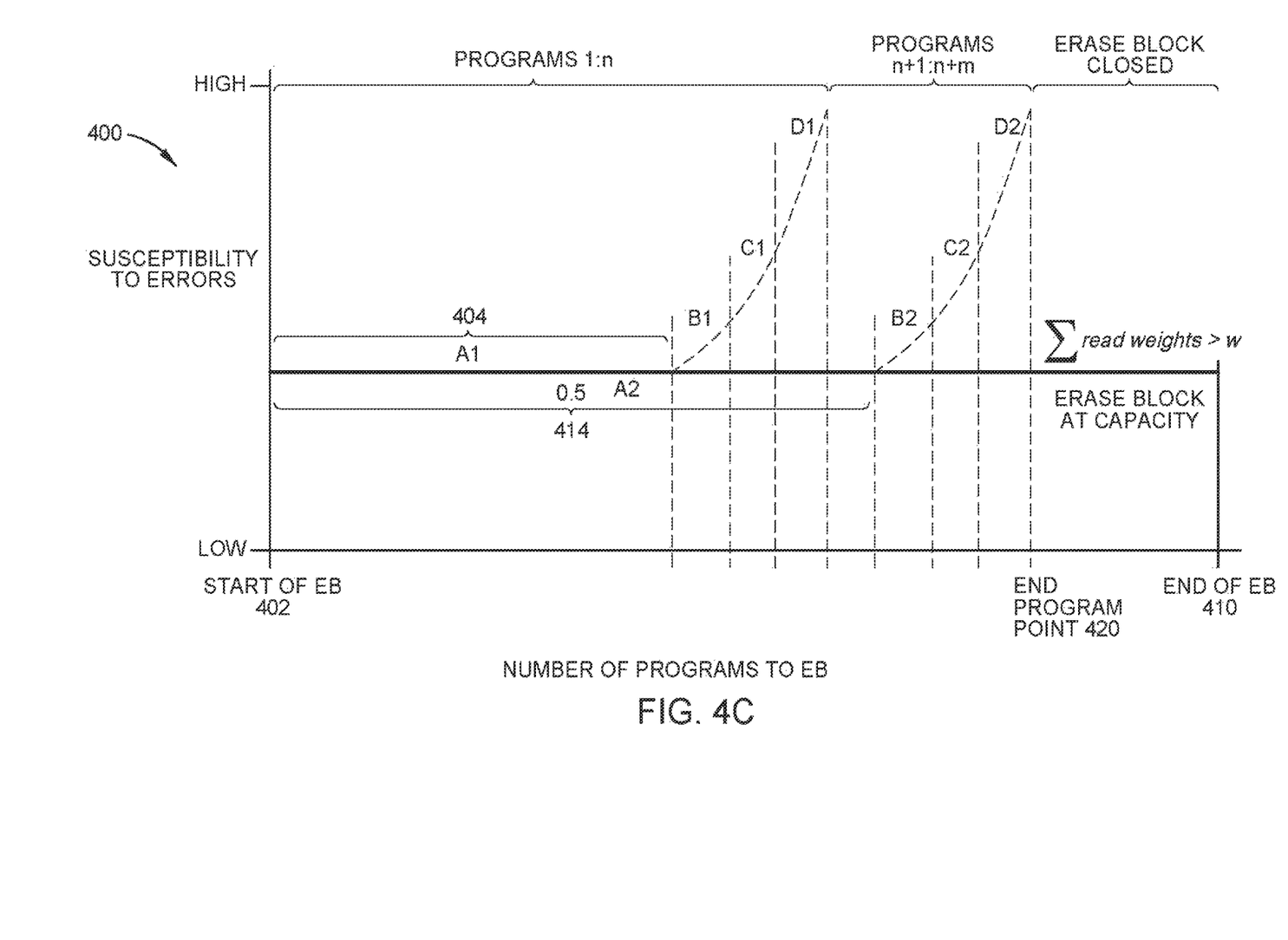

FIGS. 4A-4C are graphs illustrating the number of programs of an erase block to the read error susceptibility of the erase block, according to various embodiments. The number of programs to an erase block is on the x-axis and the susceptibility to errors is on the y-axis. The x-axis is scaled from an erase block containing no programmed data to an erase block at capacity. The total number of programs an erase block may contain at capacity is a variable value depending on the program size as well as the size of any associated metadata. In the following descriptions, the non-volatile storage unit is referred to as a NVM for simplification and exemplary purposes. Moreover, while FIGS. 4A-4C are directed towards an erase block, the same concept may apply to entire zones or entire streams, as discussed below.

Furthermore, the y-axis is scaled from low susceptibility to errors to high susceptibility to errors. The susceptibility to errors is relative and may depend on the type of non-volatile memory. In addition, the scale of low susceptibility and high susceptibility is used to provide an example to further explain the embodiments herein. The curves shown are neither limiting nor restricting and are utilized to provide a possible embodiment of the increasing susceptibility to read errors for data in an erase block.

An erase block may have a total capacity of 256 wordlines, however, the erase block may have more than or less than 256 wordlines. Data is written sequentially to a wordline in a first erase block of a first zone utilizing a write pointer, such as the pointer 310 of FIG. 3A. When all wordlines are written to in the first erase block, the first erase block may be closed (i.e., every wordline (WL) in an erase block (EB) has been programmed, such that each cell is programmed with a non-erased value). When a new write command is received, a second erase block may be appropriated for the new write data. Similar to an open and active zone, such as the open and active zone described in FIG. 3B, an open erase block is an erase block that has been partially programmed.

In one embodiment, data is written to a first wordline in a first erase block of each plane of each die within a first zone. Data is written sequentially filling each wordline of a first erase block of each plane of each die within a first zone. When all erase blocks in a zone are filled, the zone is at capacity or at ZCAP, such as the ZCAP of FIG. 3A. In another embodiment, erase blocks are entirely programmed from top to bottom (i.e., from the first wordline to the last wordline) before moving on to program another erase block. In such an embodiment, the ZCAP, such as the ZCAP described in FIG. 3B, may dynamically shrink due to filling individual erase blocks to capacity, such that the previous ZCAP is equal to the current ZCAP minus one or more closed erase blocks. For example, once a first erase block is filled to capacity, the ZCAP may dynamically reduce to exclude the filled first erase block.

However, an erase block may be closed before the erase block is at capacity due to reaching a predetermined read error susceptibility value. The predetermined read susceptibility value may be about 1000 to about 2000. The previous values for the predetermined read error susceptibility value are not intended to be limiting nor restricting, but to provide an example of a possible value. In one embodiment, the predetermined read error susceptibility value is determined when then erase block is first opened. In another embodiment, the predetermined read error susceptibility value is dynamically changing based on the current conditions, such as the current predetermined read error susceptibility and/or the current number of reads to a certain section of the erase block. In yet another embodiment, the storage device may switch the placement of user data received from the host temporarily and implement a real-time test to determine a new read error susceptibility value. As such, the predetermined read error susceptibility value may change, rather than being a set, constant value.

The controller, such as the controller 108 of FIG. 1, may indicate to the host, such as the host device 104 of FIG. 1, a zone finished recommended signal, such that the host is warned that the erase block or the zone is nearing the predetermined read error susceptibility value. The controller 108 may issue an event that informs the host device 104 that the zone or the erase block conditions have changed. The host device 104 should then retrieve a list of changes and perform any mitigations that the host device deems necessary, such as closing the zone or erase block by writing pad data or dummy data to fill the remaining capacity of the zone or the erase block.

For the following examples, the data written to an erase block has a size equal to a wordline. In the examples herein, an erase block contains 256 wordlines. The values presented for the size of a wordline and the size of an erase block are not intended to be limiting. The use of the term "wordline" throughout the following embodiments is also not intended to be limiting, but to provide a possible example to aid in the explanation of some of the possible embodiments. Data may be written to an erase block or a zone in a size greater than or less than a wordline, as discussed above.

A first program point comprises all the data currently written to an erase block, such that the first program point signifies the last programmed wordline. The probability of accumulating an error during a read to a wordline further from the first program point (i.e., closer to the start of the erase block) is generally less than a read to a wordline closer to the first program point. For example, a first program point may be about 100 wordlines of data, which a read command to the latter wordlines (i.e., nearest the first program point) has a higher error susceptibility probability than a read command to the first wordlines (i.e., nearest the beginning of the erase block).

The correlated bit error accumulation on a wordline within an open erase block reduces as the shared circuitry for programming and reading are further separated in the NAND die layout. This separation of circuitry allows for electrical behaviors to be more isolated, such as crosstalk and leakage to the components. This correlation may be related to the wordline numbering available for addressing the physical media; however, the correlation between the wordline numbering and the separation of circuitry is not always required.

A read command weight is applied to each read command to normalize the overall susceptibility to error, putting more weight on the read commands closer to a program point (i.e., read commands closer to a program point are associated with a greater weight). The curves depicted in FIGS. 4A-4C are a general representation of a possible embodiment, and other curves may be applicable for the different non-volatile memory nodes.

In one embodiment, one read weight may be applied to the programmed data section of the erase block. In another embodiment, two read weights may be applied to the programmed data section of the erase block. In yet another embodiment, three read weights may be applied to the programmed data section of the erase block. In another embodiment, four read weights may be applied to the programmed data section of the erase block. In yet another embodiment, more than four read weights may be applied to the programmed data section of the erase block.

FIG. 4A depicts a graph 400 of the read susceptibility to errors of a number of wordlines to a first program point 406 of a partially full first erase block. The first program point 406 may be any program point less than a total writeable capacity of the erase block (shown by the end of EB 410). In this example, one or more first write commands write or program data to 100 wordlines out of a total capacity of 256 wordlines in an erase block (i.e., the first program point is the 100th wordline in the erase block), and each read command received from a host is to read data specific to a wordline within the 100 wordlines. Furthermore, "programs 1:n" denotes the range of programs from the first program (i.e., the first wordline in the erase block at the start 402 of the EB) to the final program at the program point or n (i.e., the $100^{th}$ wordline in the erase block). In this example, n represents 100 wordlines or 100 programs.

Out of the 100 programmed wordlines, about 60 wordlines are located in A1, about 20 wordlines are located in B1, about 15 wordlines are located in C1, and 5 wordlines are located in D1. Furthermore, the read command weights, which indicate a level of susceptibility to errors for each section, are as follows: A1 has a first weight of 0.5, B1 has a second weight of 1, C1 has a third weight of 2, and D1 has a fourth weight of 3. The number of wordlines per section and read command weights are merely examples and are not intended to be limiting, as any number of other combinations may exist.

For example, the first 60 wordlines programmed closest to the beginning or start 402 of the erase block may be associated with a first section A1 having a first weight of 0.5, and the next 20 adjacent wordlines may be associated with a second section B1 having a second weight of 1. In the first section A1, wordline 5 may have a higher or lower error susceptibility than that of wordline 4, and wordline 6 may have a higher or lower error susceptibility than that of wordline 5, for instance. The difference in read error susceptibility between wordlines may be minimal in the first section A1. Thus, the overall error susceptibility of the wordlines may be estimated or averaged at the same value for each of the wordlines within the first section A1, as shown by the first linear portion 404 of the graph 400 of FIG. 4A.

However, in the second, third, and fourth sections B1, C1, and D1, the read error susceptibility of a wordline to the next adjacent wordline may differ significantly, as demonstrated by a first curve 408 in the graph 400 of FIG. 4A. Thus, the second, third, and fourth sections B1, C1, and D1 comprise less wordlines than the first section A1. By grouping fewer wordlines within the second, third, and fourth sections B1, C1, and D1, the overall error susceptibility within each section can still be estimated or averaged at the same value. For example, a first wordline in the second section B1 disposed closer to the first section A1 will have a lower susceptibility than a second wordline in the second section B1 disposed closer to the third section C1. As such, the lower susceptibility of the first wordline will cancel or even out the higher susceptibility of the second wordline such that the overall susceptibility of each wordline in the second section B1 can be averaged to one value.

Furthermore, the data stored up until the first program point 406 may be read non-sequentially from the first erase block. For example, the controller, such as the controller 108 of FIG. 1 may receive one or more first read commands to read data in section A1, one or more second read commands to read data in section B1, and one or more third read commands to read data in section D1. Furthermore, the controller 108 updates the weight counter table 120 after each read occurrence. For example, if 200 reads are done to section A1, 100 reads are done to B1, and 10 reads are done to D1, then the sum of the read weights is calculated as follows: 200*0.5+100l+10*3=230.

Adding onto the previous example, the controller 108 may also receive one or more fourth read commands to read data in section D1 and one or more fifth read commands to read data in section B1. Since a new read command is associated with the data in section D1, the controller 108 updates the weight of section D1 in the weight counter table 120. For example, the fourth read command is associated with 100 reads for data in section D1. The total amount of reads to section D1 is 110. Furthermore, the updated sum of the weights are as follows: 200*0.5+100*1+110*3=530.

As discussed further below, an erase block is closed after the sum of the weights associated with one or more read commands accumulates to or above a predetermined value, such as about 1000. The predetermined value indicates that too many errors have accumulated in the erase block, and that the data stored in the erase block may be in jeopardy of being lost. By weighting the read commands based on where the data being read is stored in the erase block, the life of the erase block can be more accurately predicted. For example, about 2000 reads of data from the first section A1 may be performed before the controller determines the erase block should be closed. Similarly, only about 333 reads of data from the fourth section C1 may be performed before the controller determines the erase block should be closed.

FIG. 4B illustrates the graph 400 after one or more second write commands have been received to write data to a second program point 412 in the first erase block. The second program point 412 is past the first program point 406 closer to the end of the erase block 410. The data from the first program point 406 to the second program point 412 is denoted by "programs n+1:n+m", where "n" represents the last program or wordline of the first program point 406 and "m" represents the last program or wordline of the second program point 412. The number of programs or wordlines from the first program point 406 or the one or more first write commands to the second program point 412 or the one or more second write commands in this example will be 100 wordlines so that the first erase block comprises 200 wordlines storing data out of a total capacity of 256 wordlines. The data associated with the one or more second write commands is written sequentially so that the erase block contains data of the one or more first write commands first and the data of the one or more second write commands second.

Further illustrating that a read command further away from a program point has a lower susceptibility to error, the read error susceptibility of the wordlines to the first program point 406 have a first weight of 0.5 (i.e., B1, C1, and D1 all have a weight of 0.5), as shown by the first linear portion 404 aligning with a second linear portion 414. Thus, the first curve 408 of FIG. 4A is no longer included once the data of the one or more second commands is written. Data stored in one or more wordlines written when the one or more second write commands were received may be included in the second linear portion 414 if the data is far enough away from the second program point 412. As more data is written to an erase block, the previously written data become increasing less effected by read disturbance. For example, for a 10 wordline program, the eighth and ninth wordlines may be affected by the tenth wordline program or read, but the first and second wordlines may not be affected by the tenth wordline program or read.

Like the first program point 406, the programs closer to the second program point 412 have a higher read susceptibility to error, such that a fifth section B2 has a second weight of 1, a sixth section C2 has a third weight of 2, and a seventh section D2 has a fourth weight of 3, as shown by the second curve 416 in FIG. 4B. Furthermore, read commands corresponding to the first section, denoted by A2, have a first weight of 0.5, as shown by the first and second linear portions 404, 414. Since the seventh section D2 is closest to the second program point 412, the read susceptibility to error is the highest compared to the other sections C2, B2, and A2. Hence, the seventh section D2 has a higher weight associated with each read command than that of sections A2, B2, and C2.

Furthermore, data stored up to the second program point 412 (including through the first program point 406) may be read non-sequentially from the first erase block. For example, the controller, such as the controller 108 of FIG. 1 may receive one or more first read commands to read data in the fifth section A2, one or more second read commands to read data in the sixth section B2, and one or more third read commands to read data in the eighth section D2. The controller 108 updates the weight counter table 120 for each read command as well as the sum of the weights. Continuing the example of FIG. 4A, if the one or more first read commands to read data in the second section A2 contains 200 reads, the one or more second read commands to read data in the sixth section B2 contains 10 reads, and the one or more third read commands to read data in the eighth section D2 contains 20 reads, then the updated sum is calculated as follows: 530 (value taken from FIG. 4A example) +200*0.5+10*1+20*3=700.

FIG. 4C illustrates the graph 400 after one or more third write commands have been received to write data to the first erase block. Data may be written to the first erase block such that the first erase block is either closed or written to capacity. In the prior case, the first erase block is closed by filling in the open capacity with pad data. An erase block is closed after the sum of the weights associated with one or more read commands accumulates to or above a predetermined value. The predetermined value may be about 1000. The predetermined value indicates that too many errors have accumulated in the erase block, and that the data stored in the erase block may be in jeopardy of being lost. For example, one or more third write commands are received to write data to an end program point 420. After receiving one or more read commands to read data from anywhere in the first erase block, the weights of the read commands are accumulated and found to be to the predetermined value. The controller may then write pad or dummy data to the first erase block to fill up the wordlines between the end program point 420 and the end of the EB 410. The predetermined value listed is not intended to be limiting, and other embodiments of the predetermined value may be valid.

For example, if the sum of weights is equal to or greater than a predetermined value, such as about 1000, for a plurality of read commands to the first section A2 associated with a first weight of 0.5, the second section B2 associated with a second weight of 1, the third section C2 associated with a third weight of 2, and the fourth section D2 associated with a fourth weight of 3, then the controller 108 will close the first erase block due to the high overall susceptibility to errors or the high probability that an unacceptable quantity of bit errors have accumulated. Pad or dummy data will be written to the first erase block in order to fill the first erase block to capacity (i.e., to the end of the EB 410).

Furthermore, different read commands may be received to read data from the same section or from different sections in the erase block. The controller 108 may close the first erase block at any point after the weight of the read commands exceeds or equals a predetermined value, such as about 1000. For example, the first erase block may be closed at the first program point 406 if the sum of the read commands equals or exceeds a predetermined value, such as about 1000. The previous total in FIG. 4B of 700 is stored in the weight counter table 120 of FIG. 1. If a new read command corresponding to data in the eighth section D2 has 100 reads, then the new total weight is calculated as follows: 700+ 100*3=1000. Since the new total weight equals 1000, the controller closes the first erase block at the predetermined value, due to a high possibility that an unacceptable amount of bit errors have accumulated. The data in the first erase block may be re-written to a second erase block once the first erase block has been closed, in which case the weight count of reads would begin again at zero.

However, a first erase block also may be closed if user data is written to the writeable capacity. For example, the first erase block may be at capacity if one or more fourth write commands to write data to the remaining 56 wordlines of the first erase block are received, resulting in all 256 wordlines of the first erase block storing user data (i.e., data is written to the first erase block up to the end of the EB 410). When an erase block is closed or at capacity, the read susceptibility to errors for any read command received to read data from any of the wordlines is associated with the same weight as the first section A1 (or the fifth section A2). Thus, once the first erase block is closed or at capacity, the second curve 416 shown in FIG. 4B is no longer included. Rather, the read error susceptibility of all of the wordlines in the first erase block is the same, as shown in the line 422 in FIG. 4C.

Furthermore, the embodiments presented in FIG. 4A-4C may also be applied to a zone within a plurality of zones, rather than only to one erase block within a zone. For example, one or more first write commands may be received to write data to one or more erase blocks in a first zone of a plurality of zones. The one or more first write commands partially fill the first zone to a first program point that is less than the total writable capacity, or the ZCAP, of the first zone. When one or more read commands are received to read data from the first zone non-sequentially, read weights are applied to each read command, as described above.

The susceptibility of read disturb errors are diminished in a closed or at capacity erase block because neighboring wordlines are no longer being programmed. When a neighboring wordline is being programmed, the voltage applied to the currently programmed wordline may affect the voltage of the previously programmed wordline, which may lead to bit errors. Thus, the final write to a wordline in an erase block locks down the bit error susceptibility, which may result in a singular read error susceptibility section. A second erase block may be written to after the first erase block is closed or at capacity.

Each read weight is dependent on the location of the data being read relative to the first program point, such that a first read weight section nearest to the beginning of the first zone may be 0.5, a second read weight section may be 1, a third read weight section may be 2, and a fourth read weight section nearest to the first program point may be 3. Read requests for data closer to the first program point have a higher weight than read requests for data further away from the first program point. When the sum of the read weights is equal to or greater than a predetermined value, such as about 1000, the first zone is closed by filling the remaining capacity with dummy or pad data. Data of new write commands are then written to a second zone or second erase block.

However, the first zone or first erase block may also be closed when the zone or the erase block is storing user data to the zone capacity or erase block capacity, in which case each read command to read data from the zone or the erase block would have the same weight, like discussed above. The read weight values and the predetermined value are not intended to be limiting, and other embodiments may exist. Furthermore, by applying a weight to read commands dependent on the location of the data within an erase block or a zone, the overall life of a memory unit may be improved by not limiting an erase block or a zone to strictly about 1000 reads. The weight system may allow for more reads to an erase block or a zone as well as decrease the possibility of an unacceptable quantity of bit error accumulation. As such, the overall life of the erase blocks or zones can be more accurately predicted, allowing the life of the erase blocks or zones to be extended. Thus, the storage device may operate in a more effective and efficient manner.

In one embodiment, a storage device comprises a non-volatile storage unit. The capacity of the non-volatile storage unit is divided into a plurality of zones. The non-volatile storage unit further comprises a plurality of dies and each of the plurality of dies comprises a plurality of erase blocks. The storage device further comprises a controller coupled to the non-volatile storage unit. The controller is configured to write data associated with one or more first commands to a first zone of the plurality of zones sequentially. The first zone has a writeable capacity and the data associated with the one or more first commands partially fills the first zone to a first program point less than the writeable capacity. The controller is further configured to receive one or more read commands to read the data from the first zone non-sequentially, wherein each of the one or more read commands is associated with a weight based on a closeness of the data being read to the first program point, and wherein at least two weights of the one or more read commands are different.

The data associated with one or more commands is written to a partially full first erase block of the first zone. The one or more read commands are to read the data stored in the first erase block. The controller is further configured to close the first erase block when a sum of the weights associated with the one or more read commands accumulates to a predetermined value. The weight of a read command is higher the closer the read command is to the first program point. The weights indicate a level of susceptibility to errors. The controller is also configured to write data associated with one or more second commands to the first zone sequentially, wherein the data associated with the one or more second commands partially fills the first zone to a second program point less than the writeable capacity. The controller is further configured to receive one or more second read commands to read the data from the first zone non-sequentially, wherein each of the one or more second read commands is associated with a weight based on a closeness of the data being read to the second program point, and wherein at least two weights of the one or more read second commands are different. The controller is also configured to close the first zone when a sum of the weights associated with the read commands accumulates to a predetermined value. The controller is also configured to write data associated with one or more third commands to the first zone sequentially, wherein the one or more third commands fill the first zone to the writeable capacity, and receive one or more third read commands to read the data from the first zone non-sequentially, wherein each of the one or more third read commands is associated with a same weight when the first zone is filled to the writeable capacity.

In another embodiment, a storage device comprises a non-volatile storage unit. The capacity of the non-volatile storage unit is divided into a plurality of zones. The non-volatile storage unit further comprises a plurality of dies and each of the plurality of dies comprises a plurality of erase blocks. The storage device further comprises a controller coupled to the non-volatile storage unit. The controller is configured to receive a plurality of read commands to read data from a partially full first erase block of a first zone of the plurality of zones non-sequentially, wherein each of the read commands is associated with a weight based on a location of the data being read within the first erase block, and wherein at least two weights of the read commands are different. The controller is further configured to close the first erase block when a sum of the weights associated with the read commands accumulates to a predetermined value.

At least four weights of the one or more read commands are different. The data being stored closest to a program point of the partially full first erase block has a higher weight than the data being stored closer to a beginning of the partially full first erase block. The weight of a read command is higher the closer the read command is to the first program point. The weights vary between about 0.5 to about 3. The predetermined value is about 1000. The weights indicate a level of susceptibility to errors.

In another embodiment, a storage device comprises a non-volatile storage unit. The capacity of the non-volatile storage unit is divided into a plurality of zones. The non-volatile storage unit further comprises a plurality of dies and each of the plurality of dies comprises a plurality of erase blocks. The storage device further comprises a controller coupled to the non-volatile storage unit. The controller is configured to receive one or more first read commands to read first data from a partially full first erase block of a first zone, where the one or more first read commands each being associated with a first weight. The controller is further configured to receive one or more second read commands to read second data from the partially full first erase block, where the one or more second read commands each being associated with a second weight greater than the first weight. The controller is also configured to receive one or more third read commands to read third data from the partially full first erase block, where the one or more third read commands each being associated with a third weight greater than the first weight and the second weight, and wherein the third weight indicates a higher error susceptibility than the first and second weights. The controller is configured to close the first erase block when a sum of the first, second, and third weights accumulates to a predetermined value.

The first, second, and third weights are based on a location of the data being read within the first erase block. The one or more first read commands are to read data stored closer to a beginning of the first erase block. The one or more third read commands are to read data stored closest to a program point of the first erase block. The one or more second read commands are to read data stored between the beginning of the first erase block and the program point of the first erase block. The controller is further configured to receive one or more fourth read commands to read fourth data from the partially full first erase block, where the one or more fourth read commands each being associated with a fourth weight greater than the second weight and less than the third weight, and close the first erase block when a sum of the first, second, third, and fourth weights accumulates to a predetermined value. The one or more fourth read commands are to read data stored between the data of the one or more third read commands and the data of the one or more second read commands. The first weight is about 0.5, the second weight is about 1, the third weight is about 3, the fourth weight is about 2, and the predetermined value is about 1000.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
   a non-volatile storage unit, wherein a capacity of the non-volatile storage unit is divided into a plurality of zones, wherein the non-volatile storage unit comprises a plurality of dies, each of the plurality of dies comprising a plurality of erase blocks, and wherein each zone of the plurality of zones comprises a plurality of erase blocks; and
   a controller coupled to the non-volatile storage unit, wherein the controller is configured to:
      write data associated with one or more first commands to a first zone of the plurality of zones sequentially, the first zone having a writeable capacity, wherein the data associated with the one or more first commands partially fills the first zone to a first program point less than the writeable capacity; and
      receive one or more read commands to read the data from the first zone non-sequentially, wherein:
         a weight of a plurality of initial weights is applied to each of the one or more read commands, the plurality of initial weights each having a value indicating a level of susceptibility to read errors based on a closeness of the data being read to the first program point,
         the values of at least two weights of the plurality of initial weights applied to the one or more read commands are different,
         a first initial weight of the plurality of initial weights having a first level of susceptibility to read errors is associated with a first number of wordlines in the first zone disposed closest to a zone starting point of the first zone,
         a second initial weight of the plurality of initial weights having a second level of susceptibility to read errors higher than the first level is associated with a second number of wordlines in the first zone disposed closest to the first program point, and
         the first number of wordlines is greater than the second number of wordlines.

2. The storage device of claim 1, wherein the data associated with the one or more commands is written to a partially full first erase block of the first zone, and wherein the one or more read commands are to read the data stored in the first erase block.

3. The storage device of claim 2, wherein the controller is further configured to: close the first erase block when a sum of the weights applied to the one or more read commands accumulates to a predetermined value.

4. The storage device of claim 1, wherein the weight of a read command is higher the closer the read command is to the first program point.

5. The storage device of claim 1, wherein the controller is further configured to:
   write data associated with one or more second commands to the first zone sequentially, wherein the data associated with the one or more second commands partially fills the first zone to a second program point less than the writeable capacity; and
   receive one or more second read commands to read the data from the first zone non-sequentially, wherein a weight of a plurality of updated weights is applied to each of the one or more second read commands, the plurality of updated weights each having a value indicating a level of susceptibility to read errors based on a closeness of the data being read to the second program point, wherein the values of at least two weights of the plurality of updated weights applied to the one or more read second commands are different, wherein the first number of wordlines in the first zone and the second number of wordlines in the first zone each have a first updated weight, and wherein a third number of wordlines in the first zone disposed closest to the second program point has a second updated weight greater than the first updated weight.

6. The storage device of claim 1, wherein the controller is further configured to close the first zone when a sum of the weights associated with the read commands accumulates to a predetermined value.

7. The storage device of claim 1, wherein the controller is further configured to:
   write data associated with one or more third commands to the first zone sequentially, wherein the one or more third commands fill the first zone to the writeable capacity, and
   receive one or more third read commands to read the data from the first zone non-sequentially, wherein a same weight of the plurality of initial weights is applied to each of the one or more third read commands when the first zone is filled to the writeable capacity.

8. A storage device, comprising:
   a non-volatile storage unit, wherein a capacity of the non-volatile storage unit is divided into a plurality of zones, and wherein the non-volatile storage unit comprises a plurality of dies, each of the plurality of dies comprising a plurality of erase blocks, and wherein each zone of the plurality of zones comprises a plurality of erase blocks; and
   a controller coupled to the non-volatile storage unit, wherein the controller is configured to:

receive a plurality of read commands to read data from a partially full first erase block of a first zone of the plurality of zones non-sequentially, wherein:
a weight of a plurality of weights is applied to each of the one or more read commands, the plurality of weights each having a value indicating a level of susceptibility to read errors based on a location of the data being read within the first erase block,
the values of at least two weights of the plurality of weights applied to the read commands are different,
at least two portions of data of the first zone are associated with two different weights, the at least two portions of data comprising a different number of wordlines, and
a first weight of the plurality of weights having a lowest level of susceptibility of read errors is applied to data read stored closest to a zone starting point of the first zone; and
close the first erase block when a sum of the weights applied to the read commands accumulates to a predetermined value.

9. The storage device of claim 8, wherein a value of at least four weights of the plurality of weights applied to the one or more read commands are different.

10. The storage device of claim 8, wherein the data being stored closest to a program point of the partially full first erase block has a higher weight than the data being stored closer to the zone starting point of the partially full first erase block.

11. The storage device of claim 8, wherein the weight applied to a read command is higher the closer the read command is to a first program point.

12. The storage device of claim 11, wherein each of the plurality of weights vary between about 0.5 to about 3.

13. The storage device of claim 12, wherein the predetermined value is about 1000.

14. A storage device, comprising:
a non-volatile storage unit, wherein a capacity of the non-volatile storage unit is divided into a plurality of zones, and wherein the non-volatile storage unit comprises a plurality of dies, each of the plurality of dies comprising a plurality of erase blocks, and wherein each zone of the plurality of zones comprises a plurality of erase blocks; and
a controller coupled to the non-volatile storage unit, wherein the controller is configured to:
receive one or more first read commands to read first data from a first number of wordlines of a partially full first erase block of a first zone, a first weight of a plurality of weights being applied to each of the one or more first read commands, the plurality of weights each having a value indicating a level of susceptibility to read errors;
receive one or more second read commands to read second data from a second number of wordlines of the partially full first erase block, a second weight of the plurality of weights being applied to each of the one or more second read commands, wherein a value of the second weight is greater than a value of the first weight, and wherein the second number of wordlines is smaller than the first number of wordlines;
receive one or more third read commands to read third data from a third number of wordlines of the partially full first erase block, a third weight of the plurality of weights of the plurality of weights being applied to each of the one or more third read commands, wherein a value of the third weight is greater than the values of the first weight and the second weight, and wherein the third weight indicates a higher error susceptibility than the first and second weights, and wherein the third number of wordlines is smaller than the first number of wordlines; and
close the first erase block when a sum of the first, second, and third weights accumulates to a predetermined value.

15. The storage device of claim 14, wherein the first, second, and third weights are based on a location of the data being read within the first erase block.

16. The storage device of claim 14, wherein the one or more first read commands are to read data stored closer to a beginning of the first erase block, the one or more third read commands are to read data stored closest to a program point of the first erase block, and wherein the one or more second read commands are to read data stored between the beginning of the first erase block and the program point of the first erase block.

17. The storage device of claim 16, wherein the controller is further configured to:
receive one or more fourth read commands to read fourth data from a fourth number of wordlines of the partially full first erase block, a fourth weight of the plurality of weights of the plurality of weights being applied to each of the one or more fourth read commands, wherein a value of the fourth weight is greater than the value of the second weight and less than the value of the third weight, and wherein the fourth number of wordlines is smaller than the first number of wordlines; and
close the first erase block when a sum of the first, second, third, and fourth weights accumulates to a predetermined value.

18. The storage device of claim 17, wherein the one or more fourth read commands are to read data stored between the data of the one or more third read commands and the data of the one or more second read commands.

19. The storage device of claim 18, wherein the first weight is about 0.5, the second weight is about 1, the third weight is about 3, the fourth weight is about 2, and wherein the predetermined value is about 1000.

20. The storage device of claim 8, wherein a first portion of data stored in the first zone has the first weight, a second portion of data stored in the first zone closer to a program point has a second weight of the plurality of weights having a second level of susceptibility to read errors higher than the lowest level, and the first portion is greater than the second portion.

* * * * *